Figure 1:
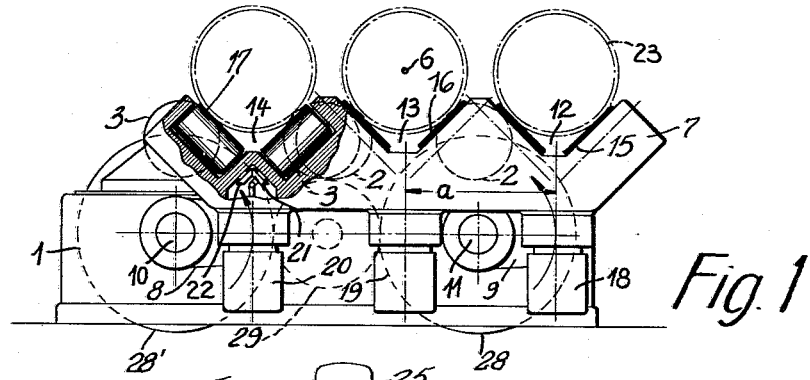

July 23, 1963    H. LINDEMANN    3,098,570
PIPE FEEDING APPARATUS
Filed May 20, 1958

INVENTOR
HANS LINDEMANN
By Dicke and Craig
ATTORNEYS

3,098,570
PIPE FEEDING APPARATUS
Hans Lindemann, Bielefeld, Germany, assignor to Th. Calow & Co. Maschinenfabrik u. Eisengiesserei, Bielefeld, Germany
Filed May 20, 1958, Ser. No. 736,531
Claims priority, application Germany May 21, 1957
2 Claims. (Cl. 214—1)

The present invention relates to an apparatus for feeding pipes and the like to machine tools in order to be worked upon.

This apparatus comprises generally a roller bed which is designed to feed pipes and the like to suitable machine tools for working upon one or both ends of the pipes and to convey them by means of a transverse feeding mechanism to another point after the work has been carried out.

If the pipes are to be fed to the machine tools which are provided with revolving tools, for example, for chamfering the ends of the pipes, it is merely necessary to prevent the pipes from turning, and then to feed them toward and against the revolving cutter head of the machine tool, provided such cutter head is not to be moved in the axial direction.

Thus, for example, if the chamfering operation is to be carried out by stationary tools, it would be necessary to rotate the pipes while they are worked upon. The feeding apparatus must therefore be provided not only with transverse feeding means and driven feed rollers which, generally, may be stopped from rotating, but also with steadies which permit the pipes to be rotated about their longitudinal axes while being worked upon.

Although for working on pipes of a relatively small diameter it is usually advisable to use machine tools with revolving cutter heads, the work on pipes of a relatively large diameter is more preferably carried out by means of stationary tools.

It is an object of the present invention to provide an apparatus of the above-mentioned type for feeding pipes of a relatively large diameter to stationary tools, and to provide such apparatus of a more simplified design than that of previous feeding devices of this type so as to reduce the cost of production and operation thereof. This apparatus is therefore to be designed so as to feed the pipes to be worked upon in the direction of their longitudinal axes toward the machine tools, and to rotate the pipes while they are being worked upon.

A feature of the present invention for attaining this object consists in rotatably mounting the feed rollers on the transverse feeding mechanism, and in operating the latter in association with at least one pair of supporting or driving rollers, the axes of which are disposed in a direction parallel to the longitudinal direction of the pipes. Such an arrangement has the advantage that the steadies which are ordinarily required to permit the pipes to rotate about their longitudinal axes will become superfluous and may thus be omitted.

If the pipes are to be worked upon at both ends, it is common to provide a machine tool at both ends of two roller beds which extend parallel to each other and in such a manner that the pipes which are moved on one roller bed are fed to one machine tool, while those which are moved on the other roller bed are fed to the other machine tool. The transverse feeding means are then designed so that the unfinished pipes which lie parallel to and in contact with each other are placed individually upon one roller bed, are fed by this roller bed to one machine, and after being worked upon are transferred to the second roller bed and fed to the second machine, whereupon, after being worked upon by this machine, they are individually passed away to another place. If, however, according to the invention, the transverse feeding mechanism of such an apparatus is provided with three pairs of feed rollers, and if two pairs of supporting rollers are mounted so that their rotary axes extend parallel to the longitudinal axes of the pipes, it will only be necessary to pivot the transverse feeding mechanism in such a manner that, after the pipes have been fed to the machine tools, the feed rollers mounted on this mechanism will no longer engage with the pipes but that the pipes will then rest upon the supporting rollers. Suitable means, for example, an internal chuck, may then be provided for rotating the pipe after being fed to the machine tool, and for working thereon by means of stationary tools. The supporting rollers may also be positively driven. If one end of a pipe has, for example, been chamfered, the transverse feeding mechanism will then be pivoted so that the feed rollers mounted thereon will again come into contact with the pipe and the pipe will thus be retracted and, by further pivoting of the transverse feeding devices, it will then be transferred to the next feed rollers and be fed by the latter to the second machine tool. If the pipe has reached the clamping fixture of this machine tool, the transverse feeding mechanism will again be pivoted so that the pipe will come to rest upon the supporting rollers of the second pair, whereupon the pipe may be chamfered and then retracted and passed away by pivoting the transverse feeding mechanism accordingly. These pivoting movements of the transverse feeding mechanism may be controlled by limit switches which may, for example, be closed when the respective pipe end has reached a certain position.

In order to permit pipes of different diameters to be worked upon, it is preferable to design the apparatus so as to permit the distance between the two supporting rollers of each pair to be adjusted and, if necessary, also to design the frame so as to permit it to be raised and lowered. The supporting rollers may then be adjusted so that the longitudinal axes of a rotating pipe lying on the rollers will be disposed at the same level as the rotary axis of the chucking fixture of the machine tool.

If a pipe is to be worked upon at both ends, it is also possible to provide only one pair of supporting rollers and to feed the pipe first to one machine tool and, after reversing the direction of rotation of the feed rollers, also to the other machine, and, after finishing both ends, to convey the pipe away from this pair of supporting rollers by means of the transverse feeding mechanism.

Further objects, features, and advantages of the present invention will become apparent from the following description thereof, particularly when read with reference to the accompanying drawings, in which—

Figure 2:
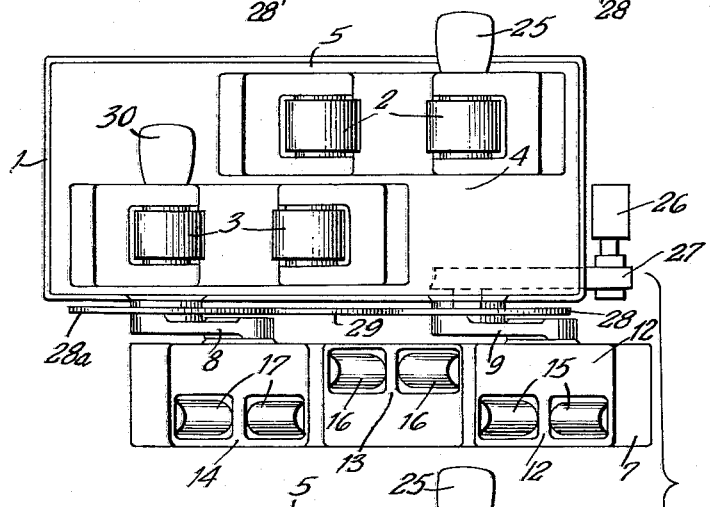
Figure 2:
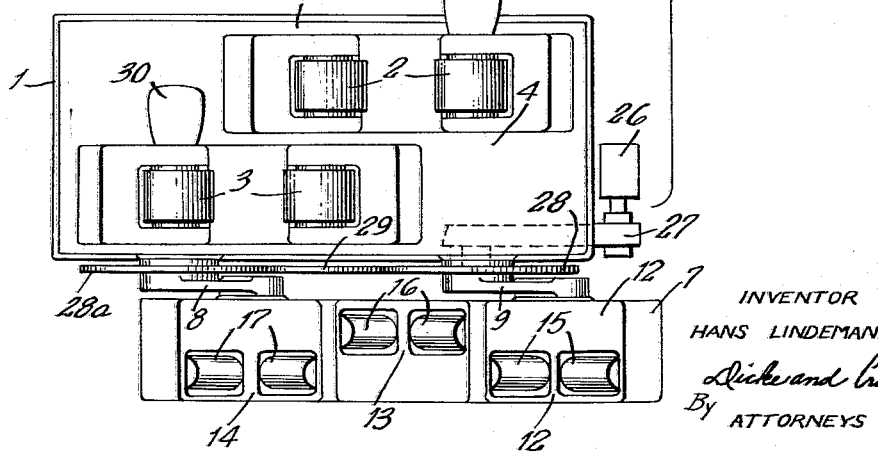

FIGURE 1 shows a front view of a roller bed according to the invention with a transverse feeding mechanism carrying the feed rollers; while FIGURE 2 shows a plan view thereof.

Assuming that two machine tools which are laterally offset relative to each other are to be used for working upon both ends of a pipe which is adapted to be moved back and forth, frame 1 of the apparatus according to the invention is provided with two pairs of supporting rollers 2 and 3 which are similarly offset laterally to each other. Their rotary axes 4 and 5 lie within the same horizontal plane so that the longitudinal axes 6 of pipes of an equal diameter likewise lie within a horizontal plane which also contains the rotary axes of the chucking fixtures of the machine tools. Since it is inadvisable to make these chucking fixtures adjustable in a vertical direction, the bearings of rollers 2 and 3 of a feeding apparatus which is to be used for pipes of different diameters should preferably be made adjustable in a horizontal direction, while frame 1 should be designed to permit its adjustment in a vertical direction.

Depending upon the length of the pipes to be worked upon, two or more frames 1 are to be used, each of which is provided with rollers and a transverse feeding mechanism. According to the invention, each frame 1 carries a transverse beam 7 which is pivotably mounted thereon by means of two levers 8 and 9 of equal length which are pivotable about shafts 10 and 11, respectively, relative to frame 1 so that beam 7 will at all times remain within a horizontal plane regardless of the extent to which levers 8 and 9 may be pivoted. Shafts 9 and 10 carry gears 28 and 28', respectively, which mesh with an intermediate gear 29. Shaft 9 is driven, for example, by a motor 26 through a chain drive 27. Beam 7 has three V-shaped notches 12, 13, and 14. Each of the surfaces of these notches has a feed roller 15, 16, and 17, respectively, slightly projecting therefrom which is rotatably mounted within the beam so that the feed rollers of each pair 15, 16, and 17 extend at a certain angle, preferably a substantially right angle, to each other. Each pair of feed rollers 15, 16, and 17 is preferably driven by a separate motor 18, 19, and 20, respectively, for example, through bevel gears 21 and 22 so that rollers 15 and 16 rotate in opposite directions to each other, and so that the third rollers rotates in the opposite direction to the second rollers 16. The other rollers 2 and 3 in frame 1 are freely rotatable or may be constantly driven respectively. Motors 20 and 30 are, respectively, connected to one of the rollers 2 and to one of the rollers 3 for driving the respective roller.

The roller beds, that is, the supporting or driving rollers 2 and 3, and the transverse feeding mechanisms according to the invention may be associated with additional feeding and runoff means, not shown. If the transverse beams 7 to which a pipe is fed by means of such additional feeding apparatus are pivoted toward the left from the position illustrated in FIGURE 1, pipe 23, lying, for example, between rollers 15 will be shifted laterally by the distance a and, after the drive mechanism of these rollers has been engaged, it will be fed toward one of the machine tools. Rollers 15, 16, and 17 may also be driven constantly so that the pipes thereon will be fed toward the respective machine tool as soon as they have been received thereby. This is of importance particularly with pipes of a large diameter since the length of the non-cutting times will thus be reduced. As soon as the end of the pipe facing toward the machine tool engages with and closes a limit switch, transverse beams 7 are lowered so that the pipe threon will come to rest on the pair of supporting rollers 2 and will surround the internal clamping fixture of the machine tool. The jaws of the latter are then moved outwardly to grip the pipe. If the clamping fixture is then rotated, the pipe, which is supported by the pair of rollers 2 and is additionally driven thereby, may then be worked upon, for example, chamfered at one end. After the work on the respective pipe has been completed, the clamping fixture is again loosened. While the work is still in progress, the transverse beams 7 are further pivoted in the same direction to return to their original position so that, when they are again pivoted toward the left, feed rollers 16 rotating in the opposite direction to rollers 15 will withdraw the finished pipe from the machine tool and carry it toward the pairs of rollers 3 on the frames 1 without lowering it upon these rollers. The pipe will then be fed to the machine tool located at the opposite end of the apparatus until the other, unfinished end thereof is pushed over the internal clamping fixture of this machine. As soon as the pipe has closed a limit switch at this chucking fixture, the transverse beams 7 are lowered so that the pipe will rest upon the pairs of supporting rollers 3. The clamping fixture of the machine is then tightened and its rotation started so that the other end of the pipe may now be worked upon. While this work is still in progress, the transverse beams 7 are further turned to return to their original position so that, when they are again operated, the pipe which has been finished at both ends, after being withdrawn from the clamping fixture by feed rollers 17, can by the last part of the pivoting movement thereof be passed to the runoff means.

For the sake of simplifying the description of the new roller bed construction, it has so far been assumed that, while one pipe is being worked upon, no other pipe is being fed. It is however, to be understood that, as soon as the first pipe has been placed upon the roller bed and has been moved laterally, a second pipe may be taken up so that, while the first pipe is fed to the second machine tool, the second pipe may be fed to the first machine tool. Consequently, the individual pairs of rollers will never be idle. If a new pipe is supplied to the transverse beams 7, another pipe which has already been finished will be taken off.

Although my invention has been illustrated and described with reference to the preferred embodiments thereof, I wish to have it understood that it is in no way limited to the details of such embodiments, but is capable of numerous modifications within the scope of the appended claims. Thus, for example, one or both pairs of supporting rollers may also be omitted, and, for working upon one end of a pipe, only one pair of feed rollers with reversible driving means therefor may suffice, while for working upon both ends of a pipe, two pairs of feed rollers may suffice, the second pair of which is provided with reversible driving means for withdrawing the pipe from the first machine tool and feeding to the second machine tool, and for then retracting the pipe from the latter after its other end has been worked on.

Having thus fully disclosed my invention, what I claim is:

1. In an apparatus for transporting an elongated substantially cylindrical workpiece from one to the other of a plurality of work positions, and for rotating said workpiece when in one of said work positions, in combination, a support; a plurality of first roller means having parallel axes of rotation and mounted on said support for carrying respective elongated workpieces annd for rotatably supporting the same about respective longitudinal axes of said workpieces, said axes being substantially parallel to each other and to said axes of rotation and spaced from each other in a transverse direction; a movable frame mounted on said support for movement transverse of said longitudinal axes in a composite movement having a component parallel to a plane passing through said axes and another component transverse to said plane; a plurality of second roller means mounted on said frame and having axes of rotation transverse to said axes, said second roller means moving during said transverse movement of said frame toward and away from respective positions aligned in the direction of said respective longitudinal axes with respective ones of said first roller means and spaced from each other in a transverse direction, each of said second roller means being rotatable for affecting longitudinal movement of workpieces carried by said second roller means; and means for actuating rotation of two transversely adjacent ones of said second roller means in such a manner as to actuate longitudinal movement in opposite directions of respective workpieces carried by said two roller means.

2. In an apparatus for transporting a workpiece between a plurality of work positions, and for rotating the workpiece about its axis when in said work positions, in combination, a support; first and second rotary means mounted on said support for respectively supporting the workpiece for rotation about two parallel axes; transfer means mounted on said support for movement in a composite motion transverse to said axes and parallel to itself; three pairs of rollers, each pair of rollers having axes transverse to each other and to said parallel axes and mounted on said transfer means for movement with the same and supporting during such movement the workpiece for movement between two positions in which the axis thereof is aligned, respectively, with said two parallel axes, said three pairs of rollers moving with said transfer means along arcuate paths passing through said parallel axes and located partly outside of the plane defined by said axes of said first and second carrier means for transferring the workpiece from said first carrier means to said second carrier means and from said second carrier means to a discharge position, adjacent pairs of rollers rotating in opposite directions for longitudinally displacing a workpiece supported thereon, said three pairs of rollers successively supporting and longitudinally displacing the workpiece during movement of said transfer means and releasing the workpiece when the same is supported on said first and second rotary carrier means so that the workpiece is free to rotate on said carrier means without longitudinal movement and is in longitudinally displaced positions while supported on said first and second carrier means, respectively.

References Cited in the file of this patent

UNITED STATES PATENTS

| | | |
|---|---|---|
| 1,919,186 | Cooper | July 25, 1933 |
| 2,042,794 | Meyer | June 2, 1936 |
| 2,248,657 | Blondon | July 8, 1941 |
| 2,690,572 | Thompson | Oct. 5, 1954 |
| 2,728,327 | Benninghoff | Dec. 27, 1955 |

FOREIGN PATENTS

| | | |
|---|---|---|
| 929,474 | Germany | June 27, 1955 |